United States Patent [19]

Moulding et al.

[11] Patent Number: 5,651,806
[45] Date of Patent: Jul. 29, 1997

[54] LAMINATED VACUUM FORM GLASS MOLD

[75] Inventors: Frank Edward Moulding, South Lyon; Gerald Post, Allen Park; Eugene Stankiewicz, Gibraltar, all of Mich.

[73] Assignee: Ford Motor Company, Dearborn, Mich.

[21] Appl. No.: 359,168

[22] Filed: Dec. 19, 1994

[51] Int. Cl.⁶ .................................. C03B 23/02
[52] U.S. Cl. .......................... 65/287; 65/106; 65/291
[58] Field of Search ................ 65/287, 288, 355, 65/374.12, 106, 273, 291; 264/238, 219; 249/141, 155, 160; 425/388

[56] References Cited

U.S. PATENT DOCUMENTS

| | | | |
|---|---|---|---|
| 3,409,422 | 11/1968 | Gulotta | 65/287 X |
| 3,831,239 | 8/1974 | Hoff et al. | 65/287 X |
| 3,832,153 | 8/1974 | Bezombes | 65/291 |
| 4,349,375 | 9/1982 | Kellar et al. | 65/291 |
| 4,361,429 | 11/1982 | Anderson et al. | 65/67 |
| 4,604,124 | 8/1986 | Strauss | 65/273 |
| 4,612,031 | 9/1986 | Bennett et al. | 65/106 |
| 4,723,983 | 2/1988 | Erdmann et al. | 65/268 |
| 4,731,144 | 3/1988 | Kommineni et al. | 156/245 |
| 4,957,531 | 9/1990 | McMaster | 65/273 |
| 4,990,170 | 2/1991 | Vanaschen et al. | 65/104 |
| 5,022,907 | 6/1991 | Vanaschen et al. | 65/163 |
| 5,072,782 | 12/1991 | Namba et al. | 164/45 |
| 5,151,277 | 9/1992 | Bernardon et al. | 425/112 |
| 5,185,022 | 2/1993 | Lehto et al. | 65/182.2 |
| 5,281,117 | 1/1994 | Hong | 425/2 |
| 5,383,947 | 1/1995 | Montonen | 65/25.4 |
| 5,443,608 | 8/1995 | Agius | 65/268 |

*Primary Examiner*—Harold Pyon
*Attorney, Agent, or Firm*—Lorraine S. Melotik; Roger L. May

[57] ABSTRACT

An apparatus sculpturing from sheet material a vacuum formed glass mold. The sheet material is cut into a plurality of sections that are combined into laminated structure is that is welded together and mounted on a mold base. The top surfaces of the individual sections are machined to form a glass forming surface that can be used to vacuum form glass that conforms to the shape of the forming surface.

7 Claims, 14 Drawing Sheets

LAMINATED VACUUM FORM GLASS MOLD

FIELD OF THE INVENTION

This invention is directed to vacuum form glass molds, and more particularly relates to such molds that are laminated from sections cut out of sheet material.

BACKGROUND OF THE INVENTION

The applicants are unaware of any prior vacuum form glass mold that is laminated from sections cut from sheet metal. The closest known prior work is shown in U.S. Pat. No. 5,072,782 (Namba et al., filed Jul. 6, 1989). The Namba et al. patent describes a die for metal forming that is fabricated from various metal pieces.

In the past, the applicants have used sand casting in order to make a vacuum form glass mold. The present invention saves time and expense compared to a glass mold prepared by sand casting.

SUMMARY OF THE INVENTION

The method aspect of the invention relates to sculpturing from sheet material a vacuum form glass mold having a forming surface to which sheet glass is conformed. Preferably, the method includes the steps of cutting the sheet material into a plurality of sections. Each section has at least a first surface corresponding to a portion of the forming surface. The sections are connected together so that the first surface of one of the sections is adjacent the first surface of another one of the sections. The surfaces are then shaped, such as by machining, to form the forming surface. Forming holes are placed into the sections to allow the application of a vacuum. Sections are supported on a mold base so that the mold can be used to vacuum form glass having a surface shape like the forming surface.

According to the apparatus aspect of the invention, a glass mold comprises sections of laminated sheet material defining a glass forming surface on which sheet glass can be curved to conform to the shape of the forming surface. The combination also includes means for joining the sections, such as welds. The laminated sheet material includes means for defining holes in the sections extending through the sections from the glass forming surface to a surface opposite the glass forming surface to allow the application of a vacuum to the glass forming surface. The combination also includes a mold base, as well as means for supporting the sections on the mold base while the glass is vacuum formed on the forming surface.

BRIEF DESCRIPTION OF DRAWINGS

The detailed description of certain preferred embodiments of the invention is provided below with reference to the accompanying drawings, wherein the same reference numeral is used for a given feature in all figures.

DETAILED DESCRIPTION OF CERTAIN PREFERRED EMBODIMENTS

Referring to FIGS. 4–11, one-half of a preferred form of laminated glass mold (FIG. 1) is fabricated from 109 template sections cut from sheet metal of which sections 1, 2, 3, 5, 7, 9, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 107, 108 and 109 are illustrated. The remaining sections in the group of 109 sections have dimensions intermediate between the dimensions of the sections illustrated in FIGS. 4–11.

Figure 1:
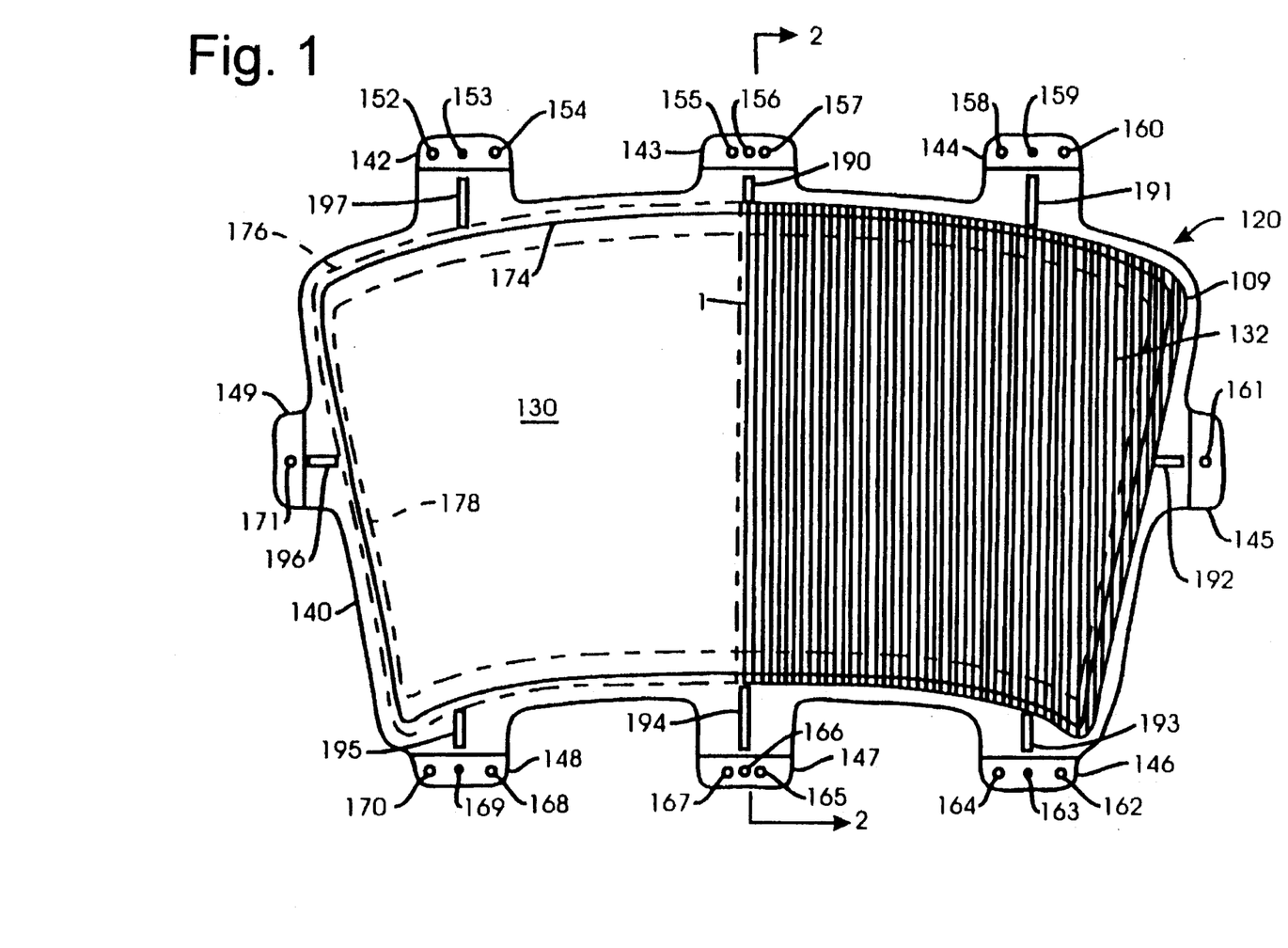
FIG. 1 is a fragmentary top plan view of a laminated glass mold made in accordance with a preferred form of the invention.

The 109 sections are laminated together to form a section group 120 that forms half of a mold forming surface 132 (FIG. 1). An additional section group 130 of 109 sections identical to group 120 is used for the other half of the mold in order to form the entirety of forming surface 132. Group 130 is located to the left of group 120 as shown in FIG. 1 within phantom line 176.

Figure 3:
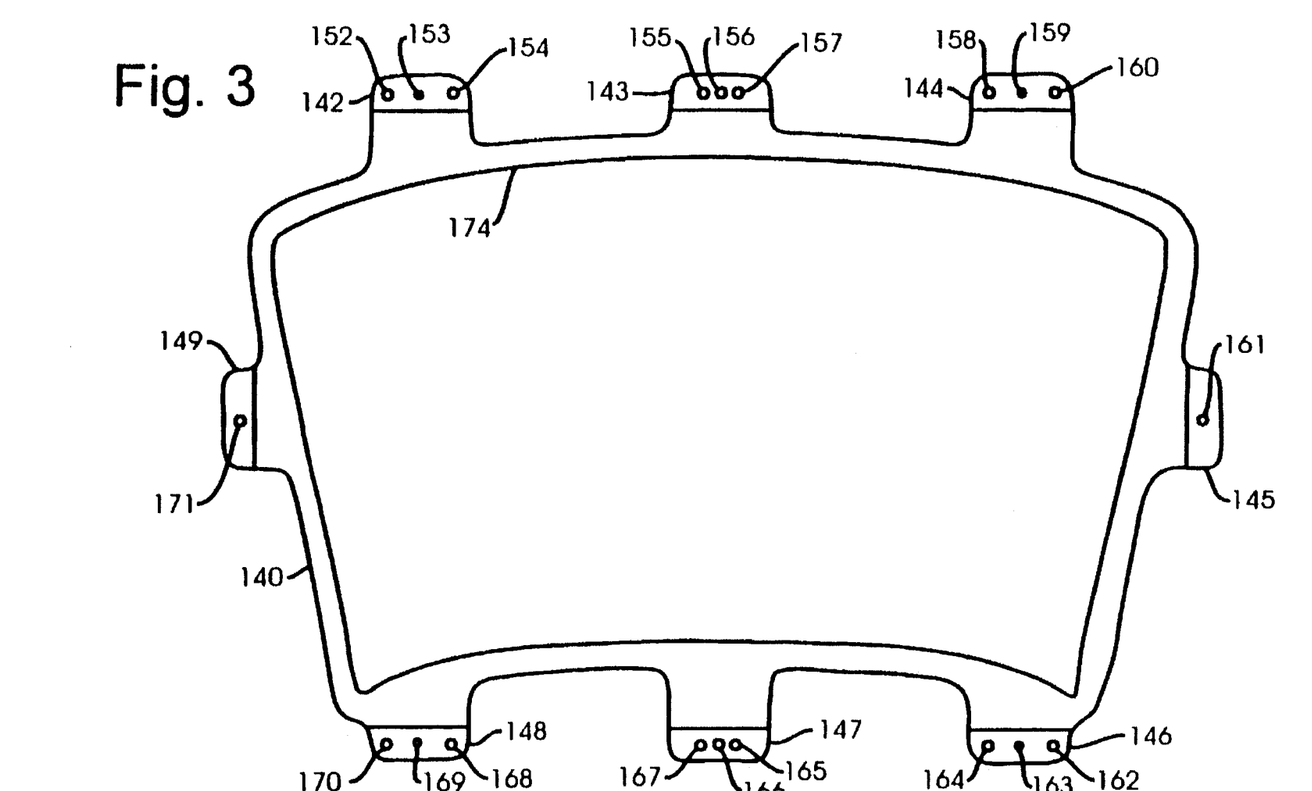
FIG. 3 is a top plan view of a preferred form of mold base made in accordance with the present invention.

Referring to FIGS. 1 and 3, the sections in groups 120 and 130 are fixed to a mold base 140 comprising flanges 142–149 that define mounting holes 152–171 arranged as shown. Mold base 140 has a inner edge 174. The edges of the sections in group 130 are aligned with line 176 (FIG. 1).

Line 178 represents a sheet of glass being formed on forming surface 132 during the glass molding process.

Figure 3A:
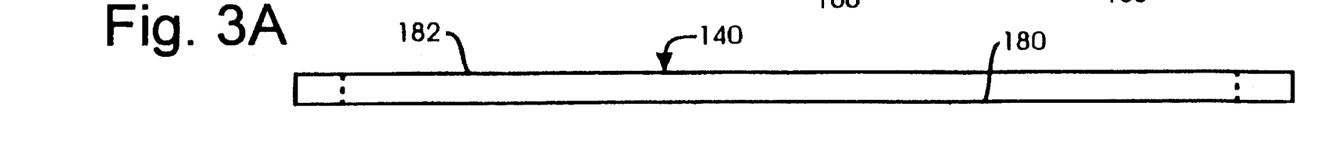
FIG. 3A is a side elevational view of the mold base shown in FIG. 3.
Figure 4:
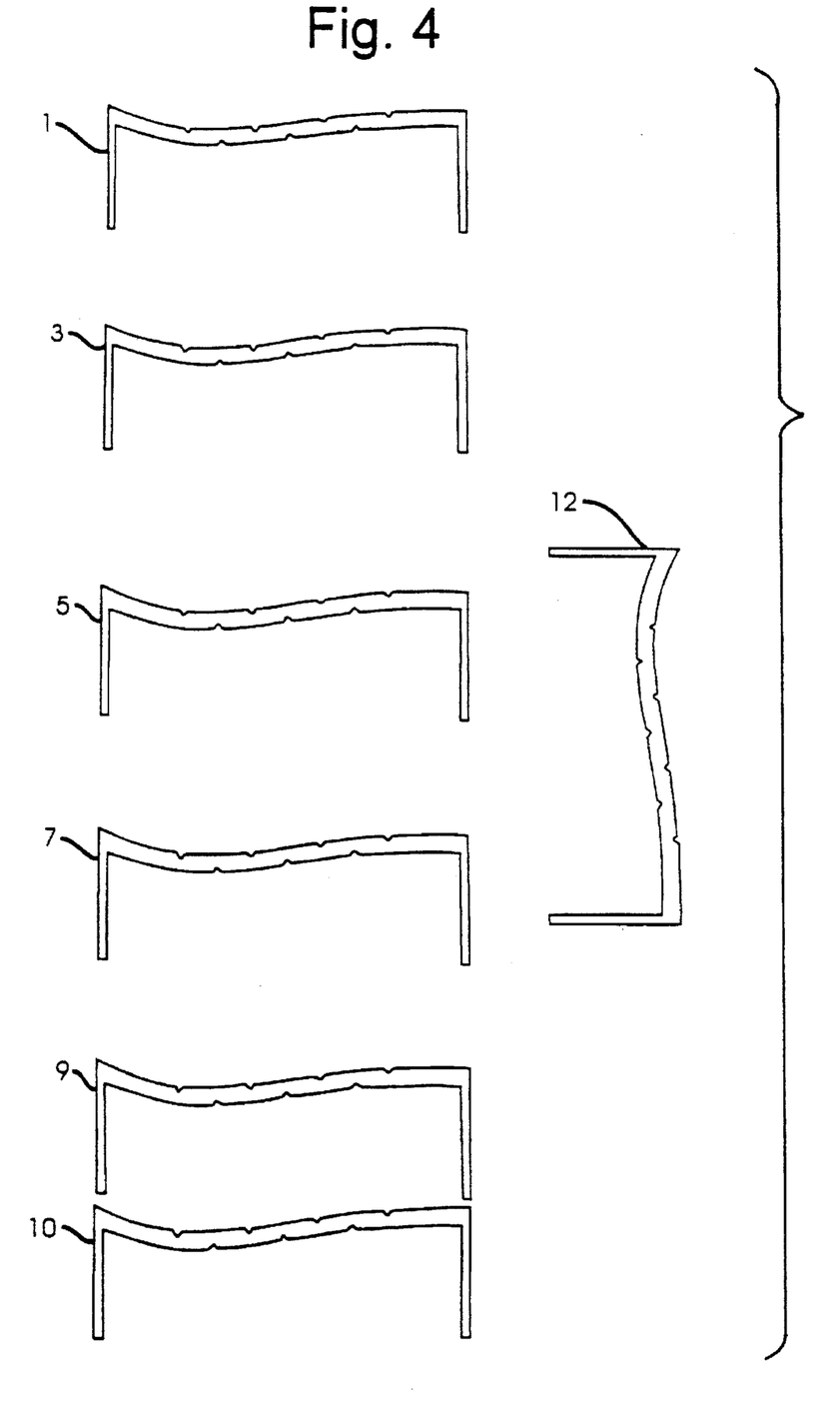
FIGS. 4–11 are side views of template sections cut from sheet material that are used to form the laminated glass mold shown in FIG. 1.
Figure 5:
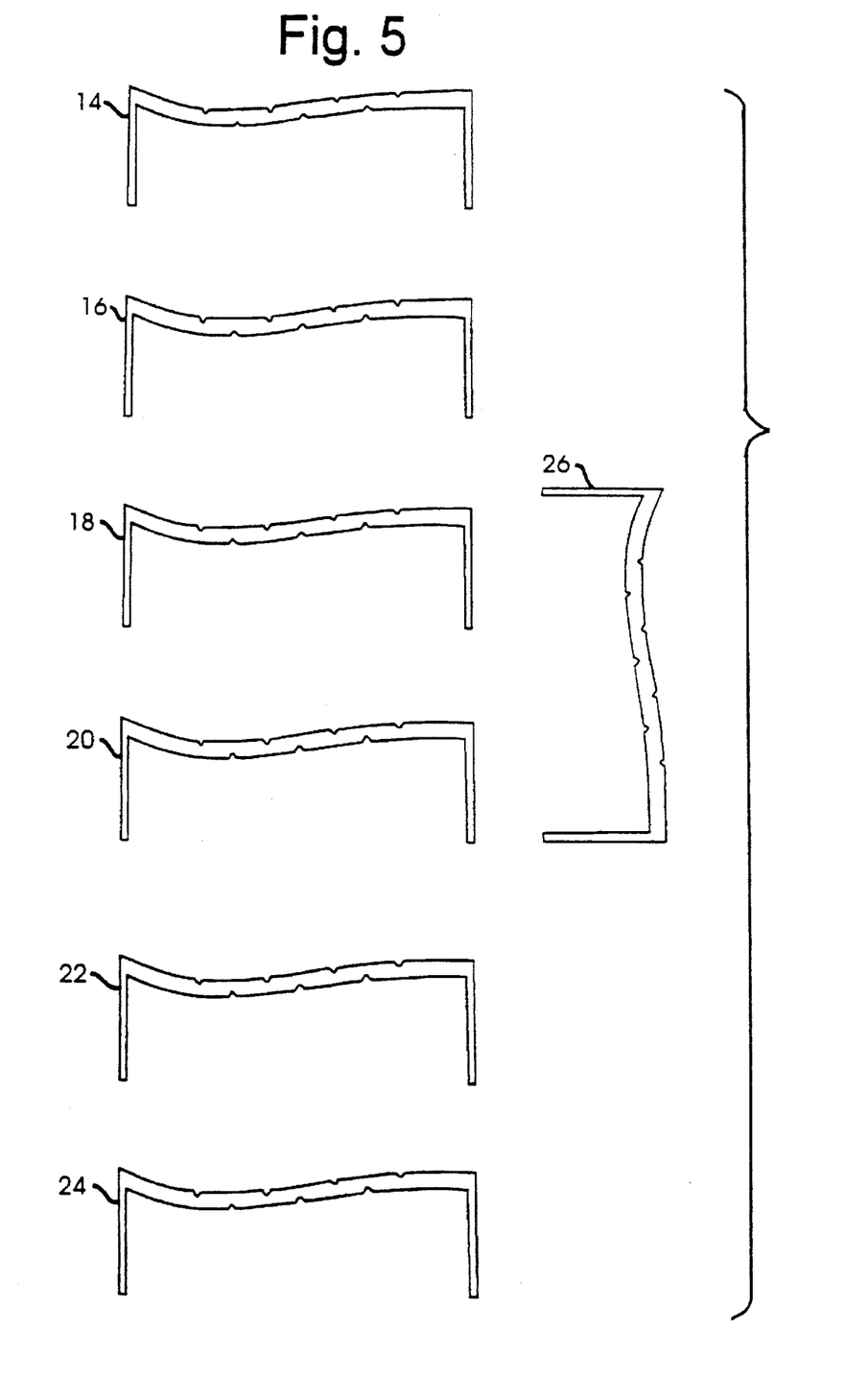
Figure 6:
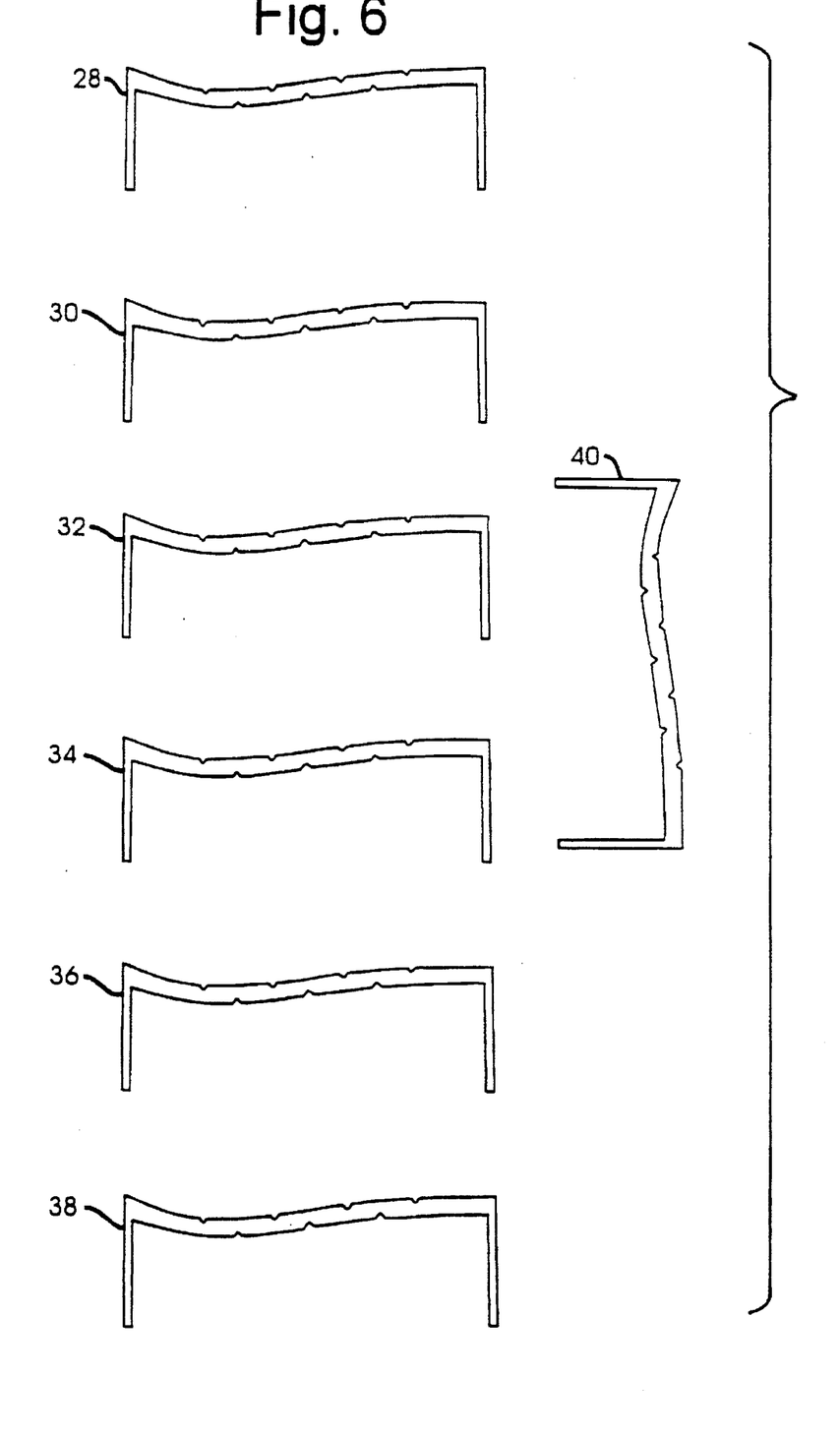
Figure 7:
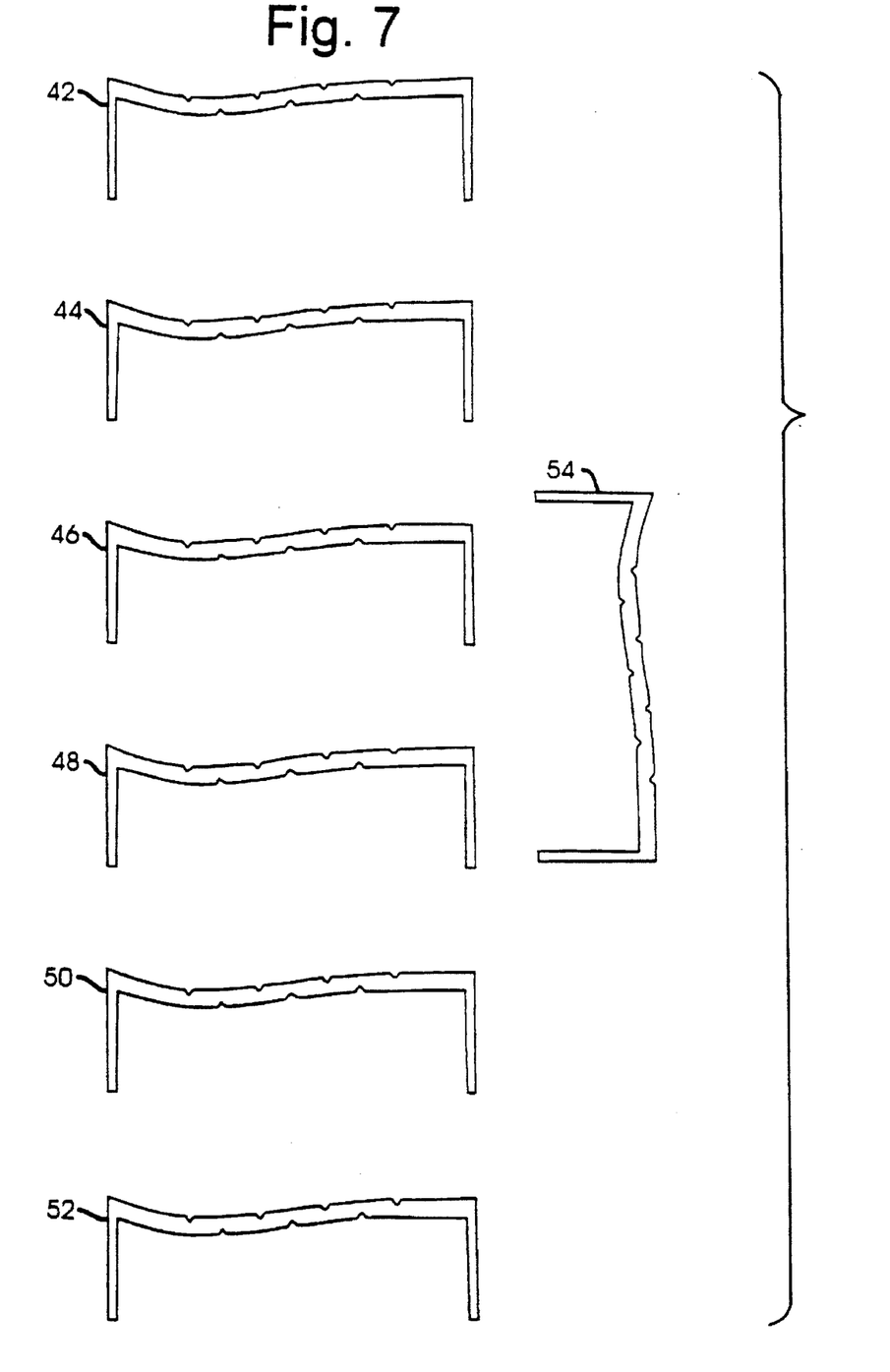
Figure 8:
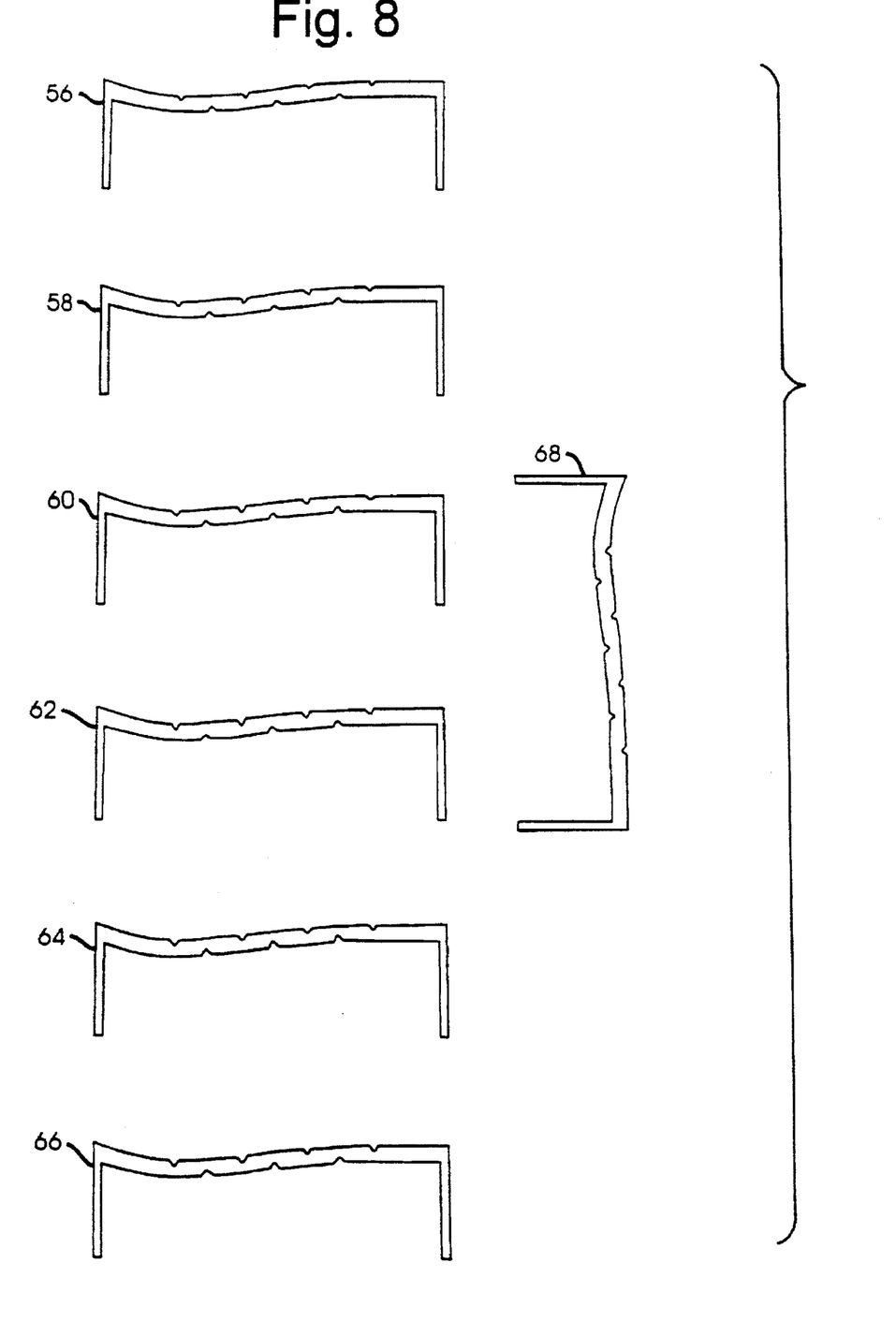
Figure 9:
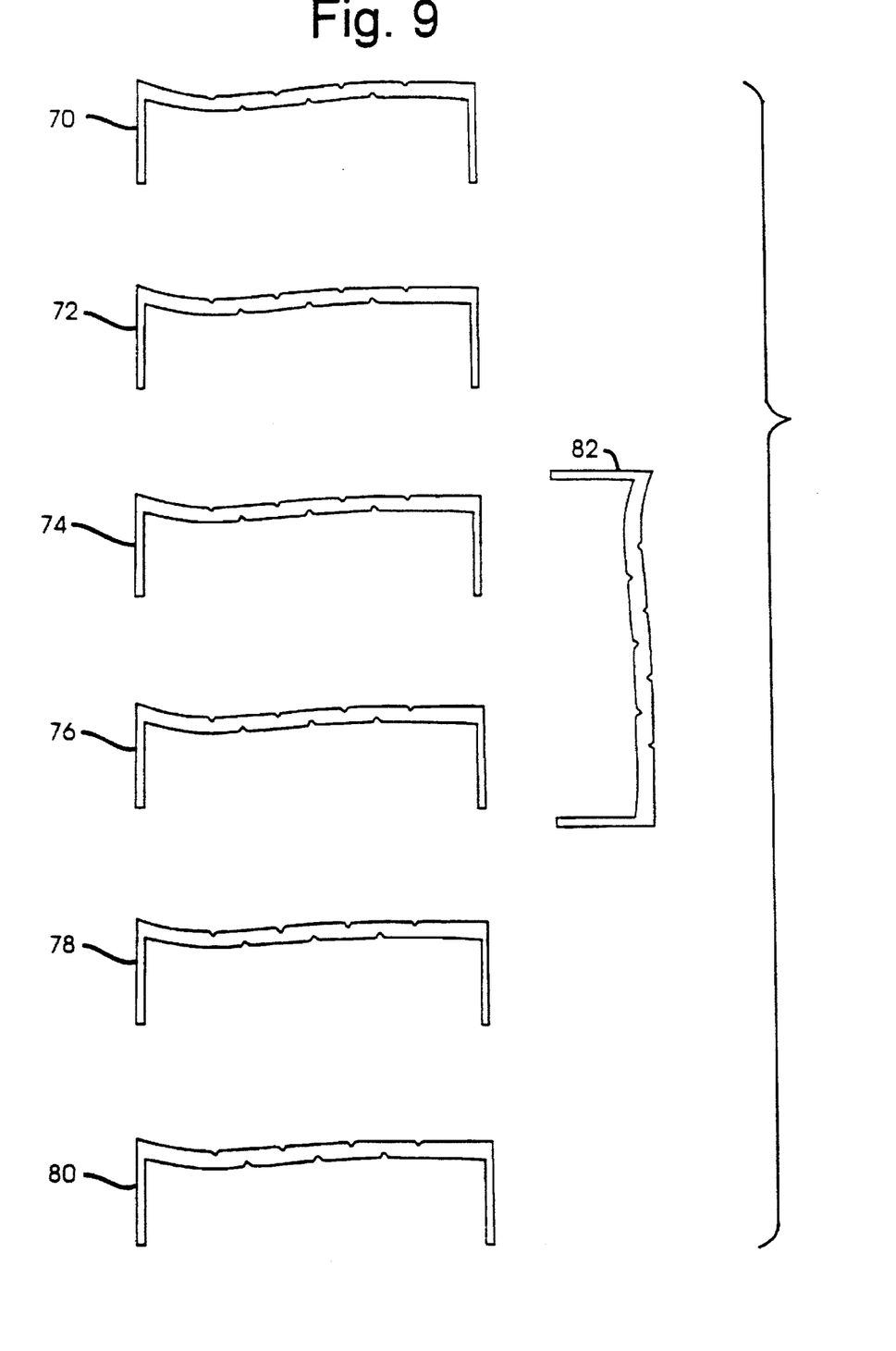
Figure 10:
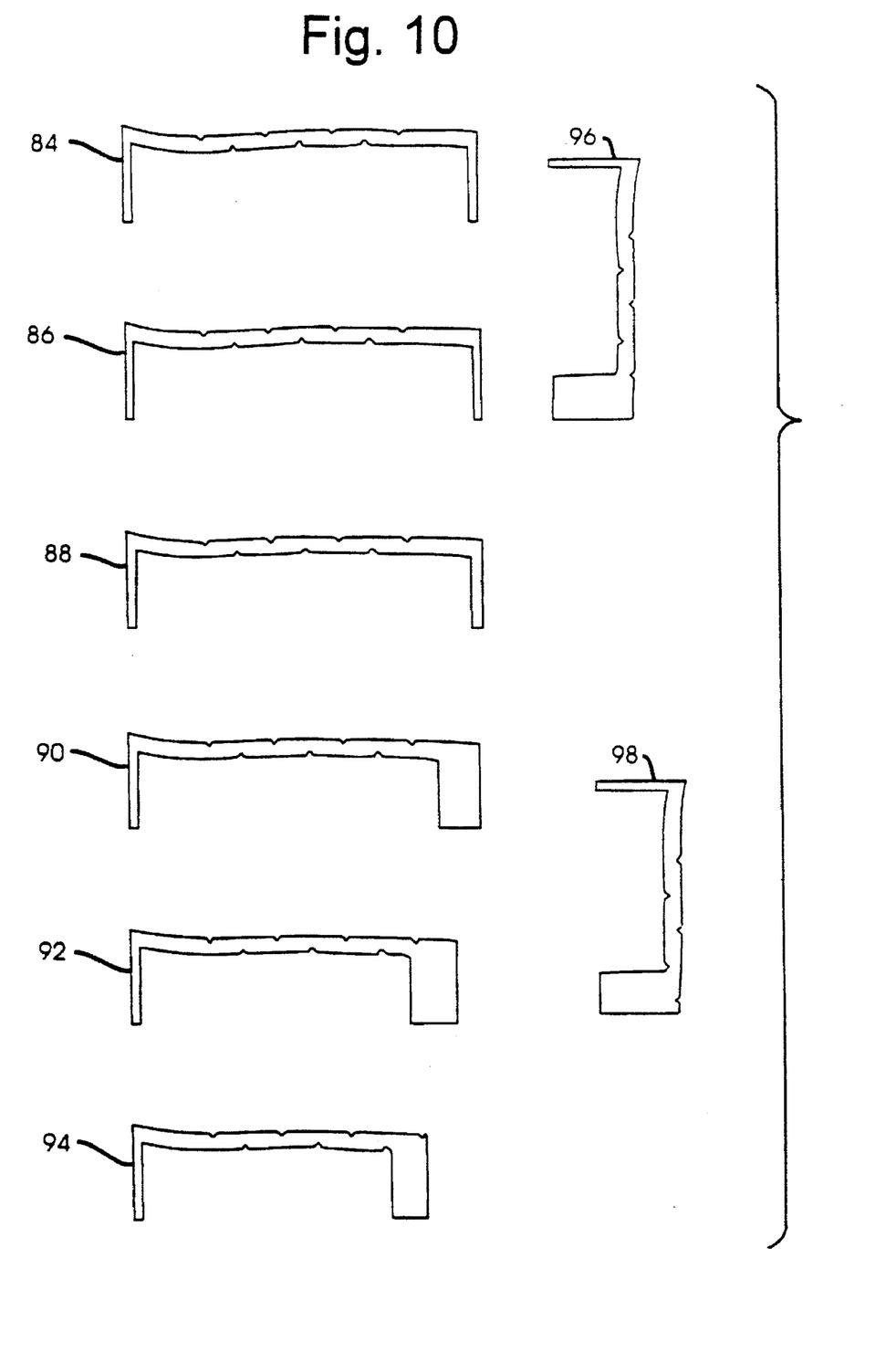
Figure 11:
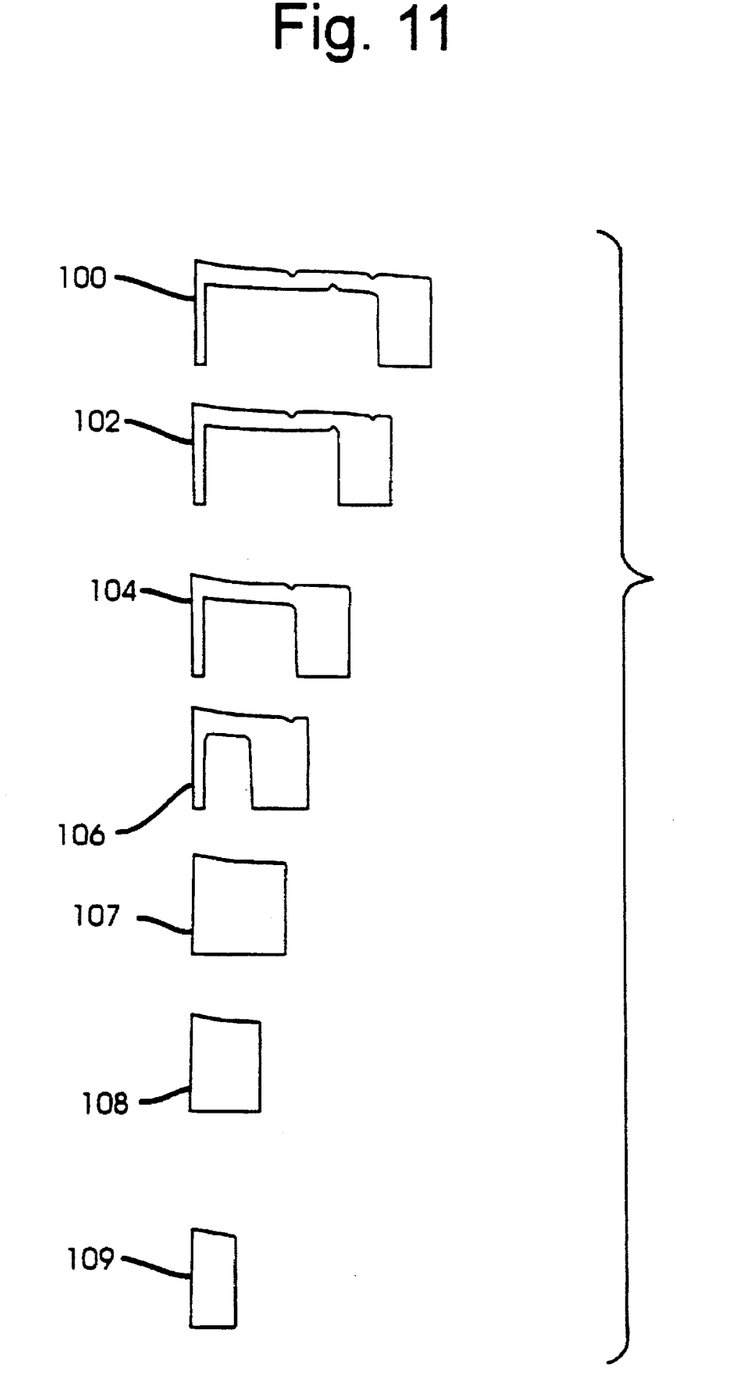

Referring to FIGS. 3 and 3A, mold base 140 comprises a bottom surface 180 and a top surface 182. Mold base 140 is fabricated from a 1½ inch thick sheet of No. 304 stainless steel plate. The base can be burned out of the sheet material by well known laser techniques.

Laminated section groups 120 and 130 are held onto mold base 140 by gussets 190–197 (FIG. 1) that are welded to both the laminated sections and the mold base.

Figure 12:
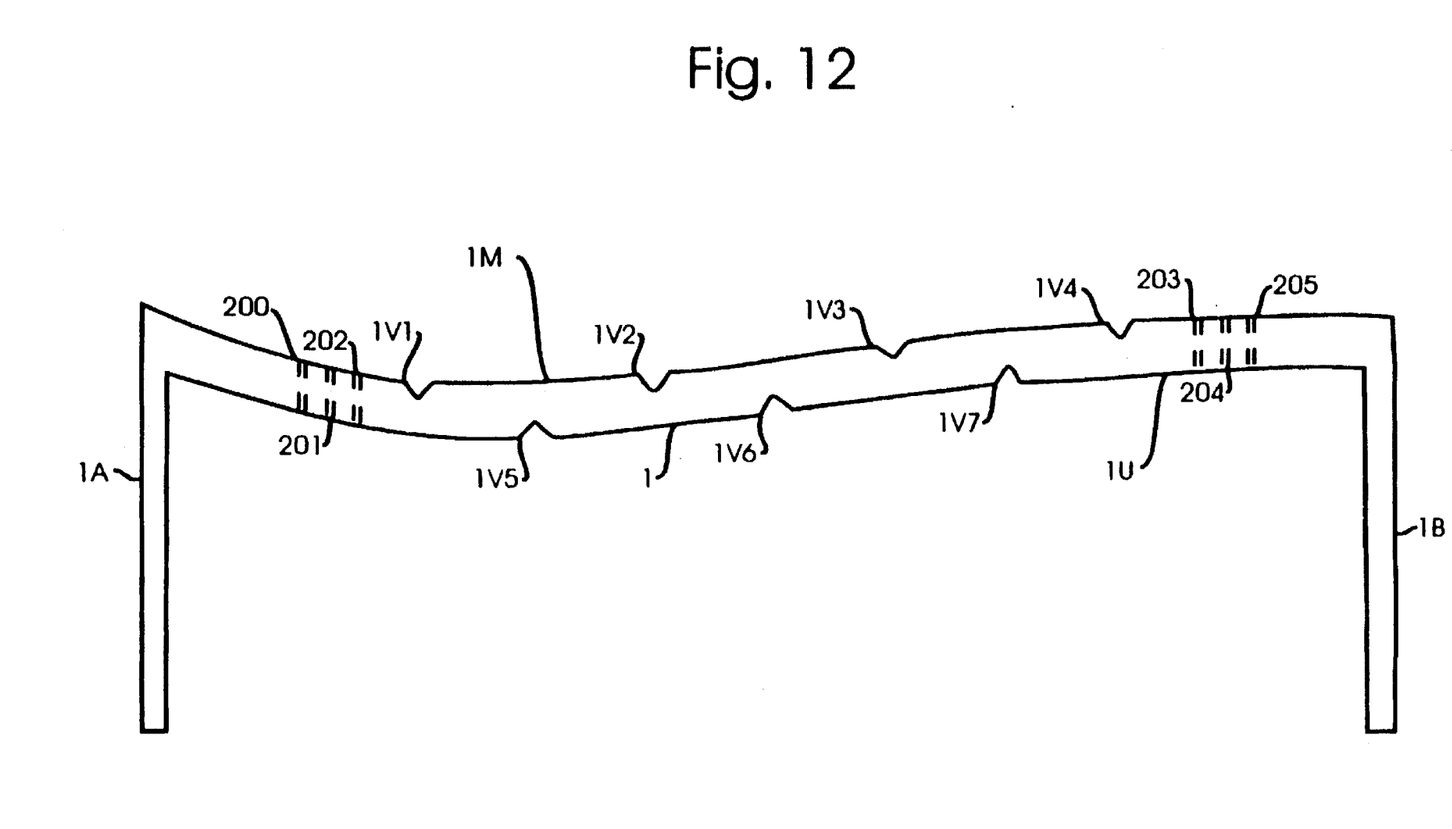
FIG. 12 is an enlarged side elevational view of section 1 shown in FIG. 4.

Referring to FIG. 12, exemplary section 1 comprises legs 1A and 1B, an under surface 1U and a machining surface 1M that is machined into a portion of forming surface 132. V-shaped grooves 1V1–1V4 are located on surface 1M and similar V-shaped grooves 1V5–1V7 are located on surface 1U.

The glass mold is fabricated according to the following method:

Mold base 140 is cut by laser techniques in a manner previously described. Each of the 109 sections in group 120 and the 109 sections in group 130 are then cut by well known laser techniques from quarter inch thick No. 304 stainless steel plates or sheet material. The sections can be cut from three dimensional CAD/CAM data in a well known manner.

Figure 13:
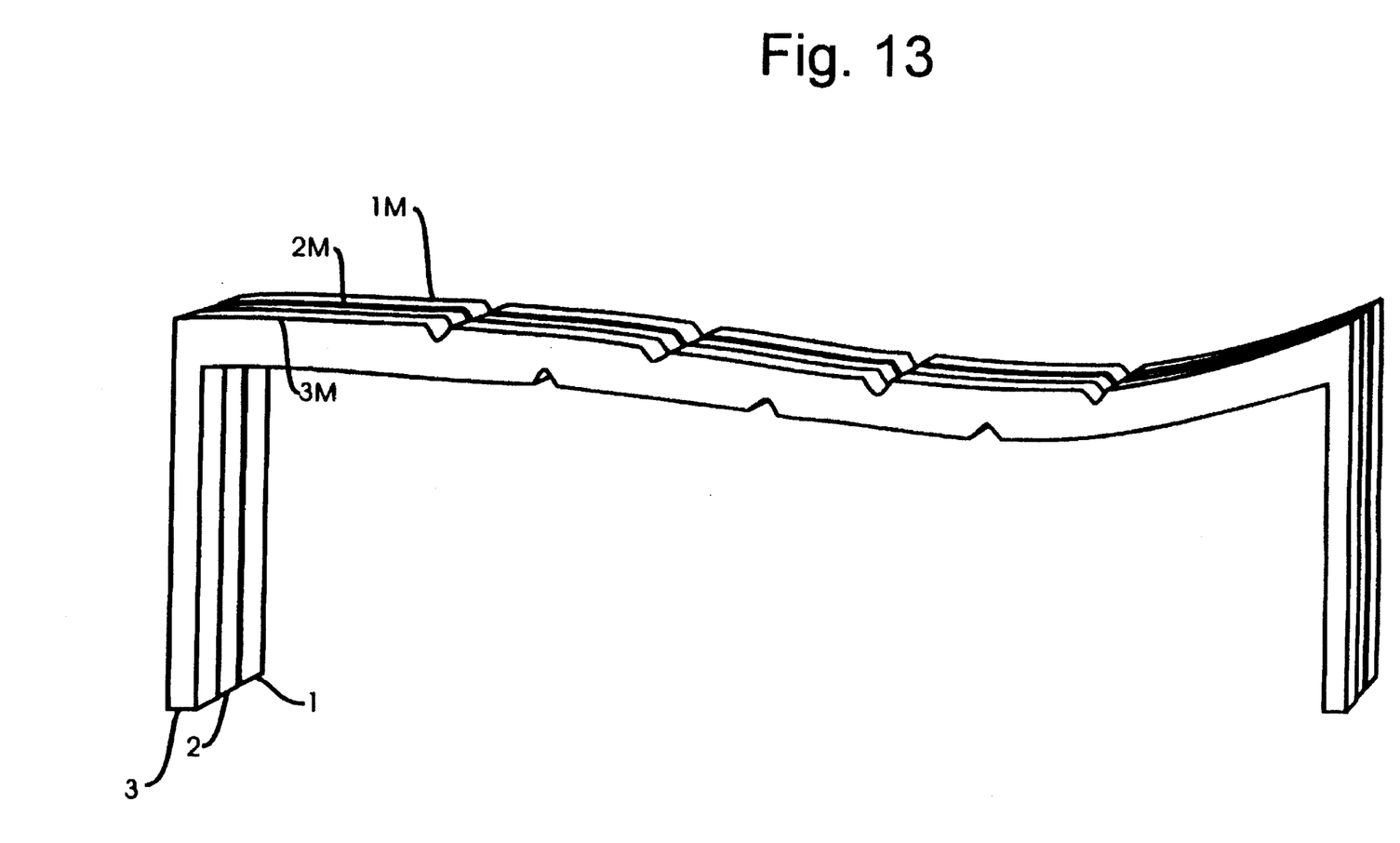
FIG. 13 is an enlarged, fragmentary perspective view illustrating how sections 1–3 are aligned.

After the sections are cut, they are aligned on base 140 in groups of about 20. The portions of sections 1–109 indicated by the lead lines to those sections are placed adjacent each other. The alignment of sections 1–3 is illustrated in FIG. 13. As shown in FIG. 13, machining surfaces 1M, 2M and 3M of sections 1–3, respectively, are aligned adjacent each other.

Figure 2:
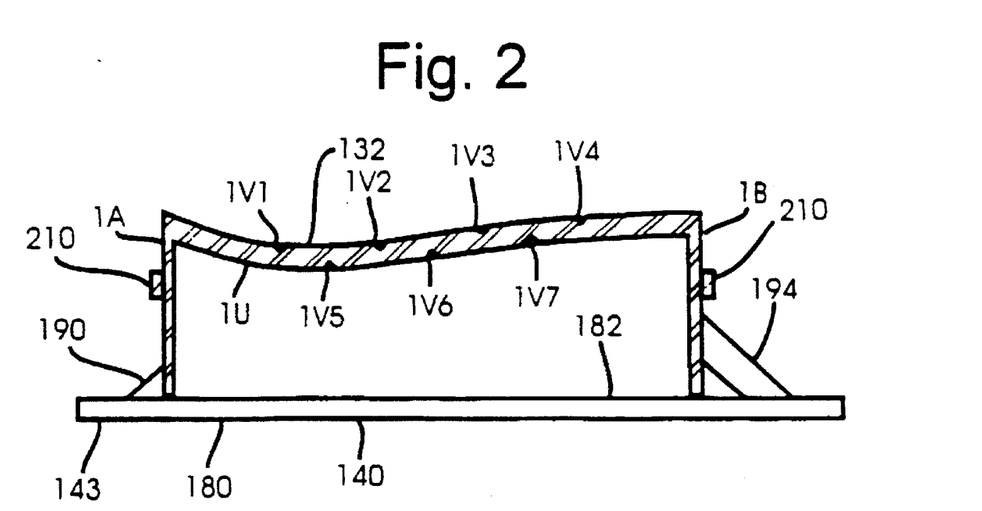
FIG. 2 is a fragmentary, cross-sectional view of the glass mold shown in FIG. 1 taken along line 2—2 in FIG. 1 with all sections other than section 1 removed.
Figure 14:
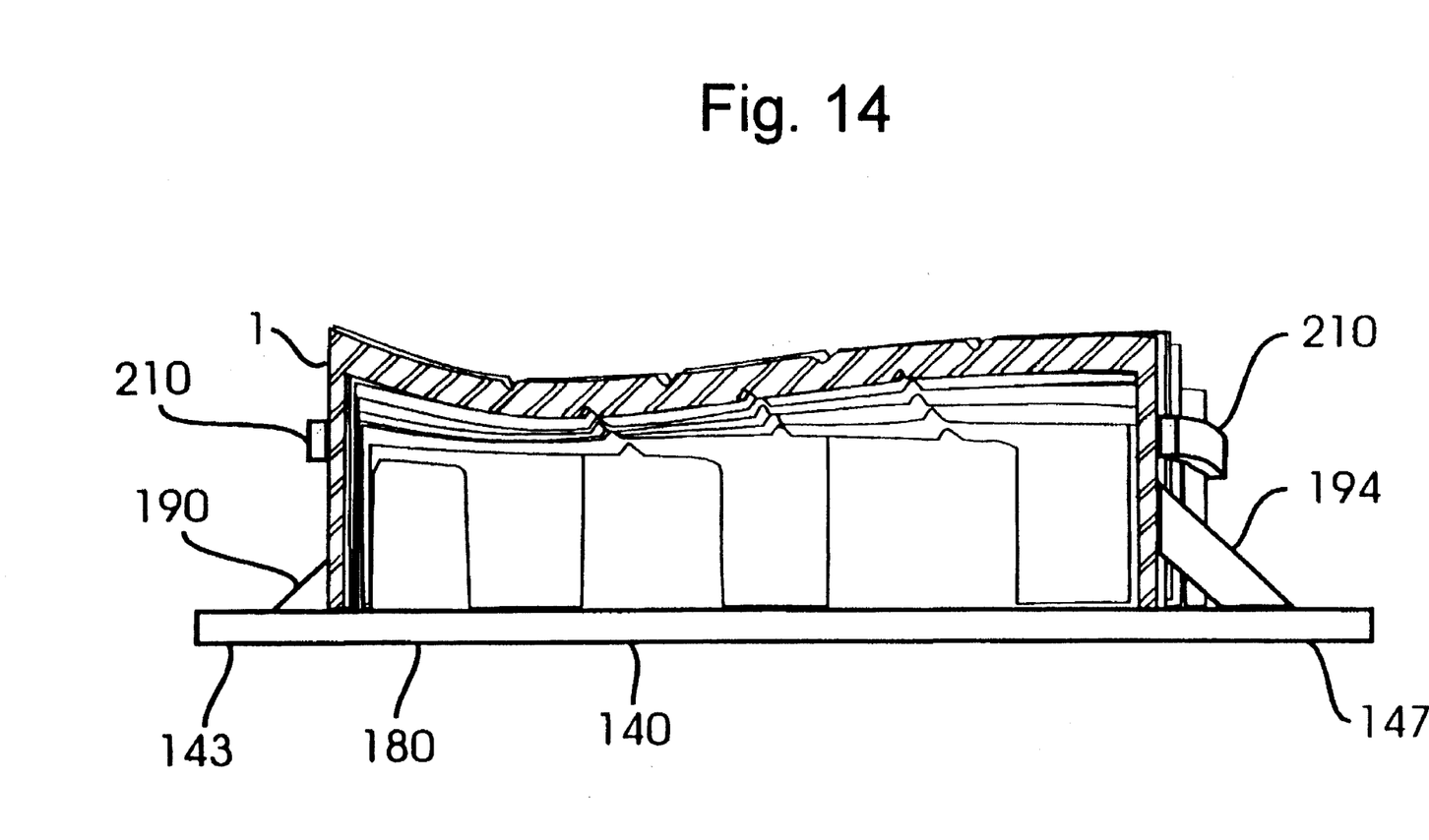
FIG. 14 is an enlarged, fragmentary cross-sectional view like FIG. 2 with additional sections added.

After alignment, the sections are tack welded together using the V-shaped grooves on both the machining surfaces and the under surfaces of the sections. The welds are applied to the V-shaped grooves in a conventional manner. After all the sections are mounted on base 140 and tacked welded together, they are permanently welded to base 140. The permanent welding is done by welding each of the legs of the sections (e.g., legs 1A and 1B shown in FIG. 12) to surface 182 of base 140. A weld band 210 is then welded around all of the legs of the assembled sections (FIGS. 2 and 14).

Gussets 190–197 are then welded between the laminated sections in groups 120 and 130 and mold base 140.

Figure 2A:
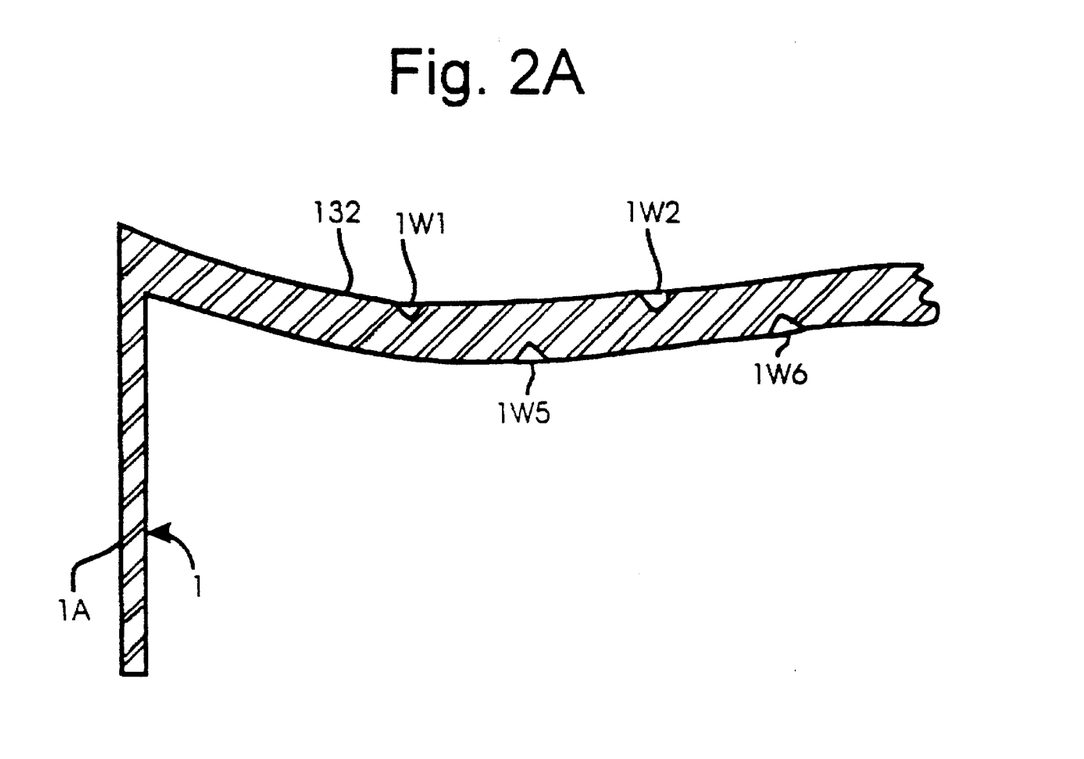
FIG. 2A is an enlarged, fragmentary, cross-sectional view of section 1 shown in FIG. 2.

The welded sections and mold base are then stressed relieved. The sections and mold base are heated to approximately 1250° C. for two to three hours and then cooled. The machining surface (e.g., surface 1M) of the various sections is then machined on a 5-axis mill according to well known techniques. The machining results in finished surface 132 that conforms to the desired shape of a glass plate. Referring to FIG. 2A, after machining, forming surface 132 includes exemplary weld elements 1W1, 1W2, 1W5 and 1W6 that remain from the tack welding previously described in the V-grooves.

After machining, vacuum holes are uniformly drilled in the sections of groups 120 and 130. The holes preferably are spaced approximately uniformly over the entirety of surface 132. The holes preferably are 3/16 inch in diameter, and the centers of the holes are arranged 2 inches apart on a 2 inch square pattern. Exemplary holes 200–205 are illustrated in FIG. 12. The holes extend completely through section 1 from surface 1M to surface 1U so that a partial vacuum can be drawn adjacent surface 132.

The completed glass mold is mounted on a frame which slips into a conventional vacuum forming machine. A glass plate is then heated to a precise temperature which allows vacuum forming on forming surface 132. The glass is placed approximately in the position as shown by line 178. Vacuum is applied through holes in the sections to cause the heated glass plate to conform to surface 132.

The various preferred versions or embodiments of the invention described in detail above are intended only to be illustrative of the invention. Those skilled in the art will recognize that modifications, additions and substitutions can be made in the various features and elements of the invention without departing from the true scope and spirit of the invention. The following claims are intended to cover the true scope and spirit of the invention.

What we claim is:

1. A vacuum form glass mold extending from a first side to a second side comprising in combination:

a plurality of sheets extending from said first side to said second side, each said sheet defining a smooth fixed portion of a glass forming surface on which sheet glass is curved to conform to the shape of said forming surface;

means for joining said sheets in a fixed relationship;

means for defining holes in said sheets extending through said sheets from said glass forming surface to a surface opposite said glass forming surface to allow the application of a vacuum to said glass forming surface;

a mold base; and means for supporting said sheets on said mold base while glass is vacuum formed on said forming surface in direct contact with said forming surface, said sheets varying in length and varying in height relative to said mold base.

2. Apparatus, as claimed in claim 1, wherein said means for supporting comprises at least one element integrally formed with each said sheet for setting the position of said glass forming surface relative to said mold base.

3. Apparatus, as claimed in claim 1, wherein said means for supporting comprises a first leg and a second leg integrally formed with at least a predetermined number of said sheets for setting the position of said glass forming surface relative to said mold base.

4. Apparatus, as claimed in claim 1, wherein said sheets comprise metal and wherein said means for joining comprises welds.

5. Apparatus, as claimed in claim 4, wherein said sheets comprise stainless steel.

6. Apparatus, as claimed in claim 1, wherein said sheets comprise metal and wherein said glass forming surface comprises a machined surface.

7. Apparatus, as claimed in claim 6 wherein said metal comprises stainless steel.

* * * * *